United States Patent [19]

Hubbard et al.

[11] Patent Number: 4,463,543

[45] Date of Patent: Aug. 7, 1984

[54] COTTON PICKER BAR

[75] Inventors: Arthur L. Hubbard; Russell D. Copley, both of Ankeny; Ronald L. Reichen, Alleman, all of Iowa

[73] Assignee: Deere & Company, Moline, Ill.

[21] Appl. No.: 420,155

[22] Filed: Sep. 20, 1982

[51] Int. Cl.³ ............................................. A01D 46/18
[52] U.S. Cl. ............................................. 56/44; 56/41
[58] Field of Search .......................... 56/41, 44, 43, 50

[56] References Cited

U.S. PATENT DOCUMENTS

| 2,140,631 | 12/1938 | Johnston | 56/43 |
| 2,593,671 | 4/1952 | Hagien et al. | 56/44 |
| 2,766,574 | 10/1956 | Hubbard et al. | 56/44 |
| 3,031,831 | 5/1962 | Jennings et al. | 56/44 |
| 3,035,389 | 5/1962 | Sadlar et al. | 56/44 |
| 3,092,949 | 6/1963 | Sadler et al. | 56/44 |
| 3,116,584 | 1/1964 | Hubbard | 56/44 |
| 3,245,210 | 4/1966 | Hubbard | 56/44 |
| 4,133,166 | 1/1979 | Hubbard | 56/44 |

Primary Examiner—Paul J. Hirsch

[57] ABSTRACT

An improved picker bar assembly for a cotton harvester. The assembly includes a cast arm with an extension which is press fitted over a hollow aluminum picker bar. The extension projects downwardly into the picker bar drum head to provide the wear surface for the picker bar journal and to distribute a greater proportion of picker bar loading to the arm. The spindle drive shaft bearing is located in the cam arm rather than within the picker bar to thereby permit utilization of a larger and higher capacity bearing.

12 Claims, 4 Drawing Figures

COTTON PICKER BAR

BACKGROUND OF THE INVENTION

This invention relates to a cotton harvester and more particularly relates to an improved picker bar assembly having a cam follower arm with an extension that projects downwardly into the drum head.

In conventional cotton harvesters of the type shown, for example, in U.S. Pat. Nos. 3,245,210 and 4,133,166 to Hubbard, a vertically disposed picker bar is journalled in the drum head of an upright cotton picking unit. Currently available picker bars are fabricated from an aluminum extrusion to reduce mass. The upper end of the bar is keyed and press fitted to a cast cam follower arm, which includes a follower seated in a cam track to properly orient the bar during harvesting. The bar supports a plurality of spindles which are driven by a spindle drive shaft rotatably supported within the bar, in part by a bearing contained within the upper portion of the bar.

A principal drawback of the typical prior art design is that the aluminum bar is one of the weakest members of the harvesting unit, and bending or fracturing of the bar or loosening of the cam follower arm can occur when the bar is subjected to abnormally high loading. The size and therefore the capacity of the spindle drive shaft bearing is limited in the prior art construction by the inner diameter of the aluminum bar.

It is therefore an object of the present invention to provide an improved cotton picker bar. It is another object to provide such a bar which overcomes the above-mentioned disadvantages of previously available picker bars.

It is a further object of the present invention to provide a cotton picker bar which is more resistant to bending and/or fracturing than at least most previously available bars. It is another object to provide such a bar wherein excess loads which would otherwise damage the bar are instead absorbed by the cam arm and drum head.

It is yet another object of the invention to provide a cotton picker bar assembly having an improved connection between the cam follower arm and the picker bar to increase strength of the bar and to resist loosening of the cam follower arm even when the bar is subjected to abnormally high loading. It is still a further object of the invention to provide an improved cotton picker bar assembly wherein the size of the spindle drive shaft bearing is not limited by the inner diameter of the aluminum bar.

The picker bar assembly of the present invention is constructed such that the cam follower arm has an extended area of press fit over the upper end of the picker bar. The extension of the arm projects downwardly into the drum head and provides a picker bar journal. Any abnormally high load which would otherwise bend or deflect the bar is transmitted into the head and arm. The extension permits placement of a high capacity spindle drive shaft bearing in the cast cam follower arm directly above the upper end of the bar. The extension also provides an increased length of press fit to resist loosening of the cam follower bar on the bar.

These and other objects, features and advantages of the present invention will become apparent to one skilled in the art from the description which follows and the accompanying drawings.

DESCRIPTION OF THE PREFERRED EMBODIMENT

Figure 1:
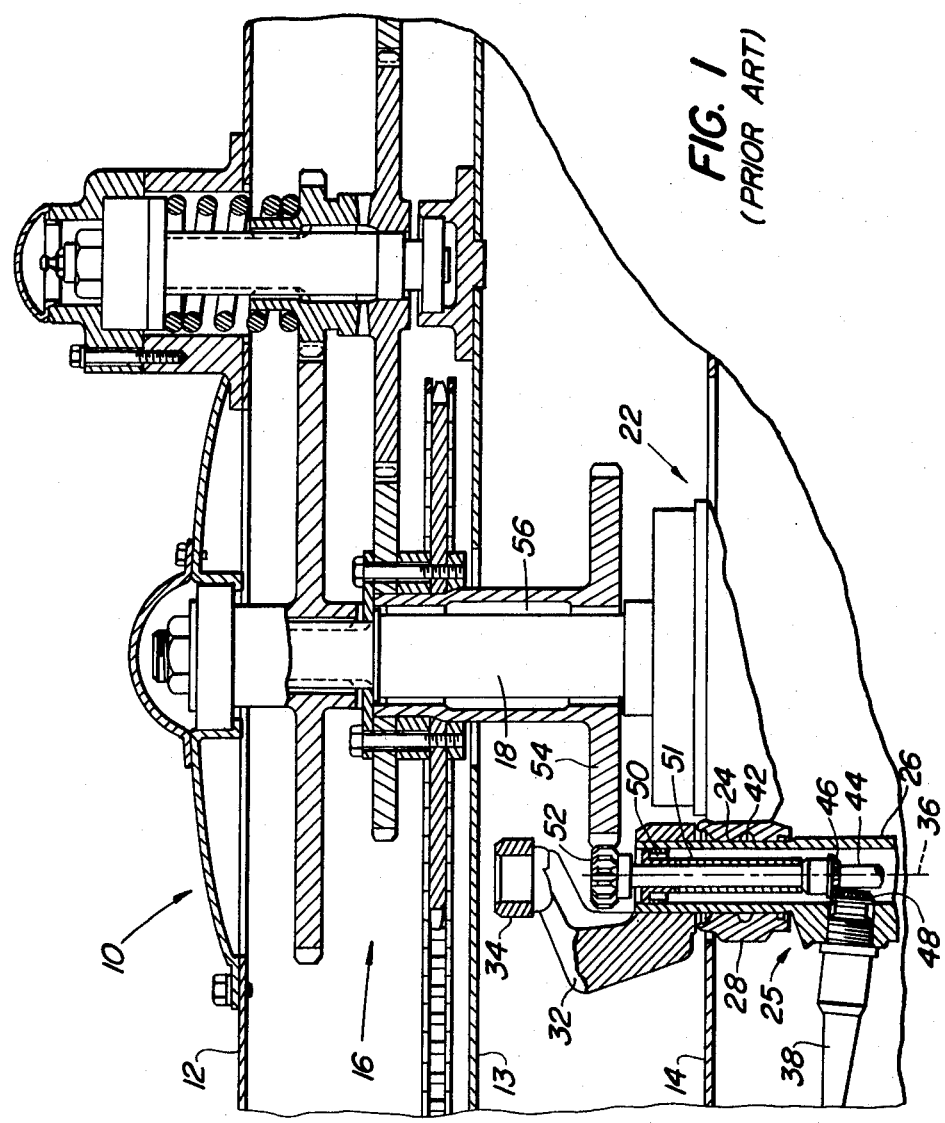
FIG. 1 is an elevational view, partially in section, showing a portion of a row harvesting unit and drive mechanism, with a picker bar assembly typical of the prior art.

Referring first to the prior art of FIG. 1, therein is shown a portion of a row harvesting unit 10 of a conventional cotton harvester of the type more fully described in the aforementioned Hubbard patents, incorporated herein by reference for background information. The unit 10 includes upper, intermediate and lower horizontal panels 12, 13 and 14, respectively, housing a conventional unit drive, indicated generally at 16, which includes an upright drum shaft 18 extending downwardly through openings in the panels 13 and 14 and connected to a drum head 22.

Spaced around the periphery of the drum head 22 are a plurality of bearing surfaces 24. Picker bar assemblies 25, each including a vertical picker bar 26, are journalled in the drum head 22 between the surfaces 24 and bearing caps 28 bolted to the head. Keyed to the upper end of each bar 26 is a cast cam arm or crank 32 which carries on its upper end a cam follower or roller 34. The follower 34 is seated in a cam track (not shown) fixed to the unit housing, and as the drum head 22 is rotated, the picker bars 26 are caused to oscillate about their respective axes 36 to orient picker spindles 38 which are vertically spaced in columns on the bars. The bars 26, which typically are fabricated from aluminum to reduce weight, include removable wear surfaces or sleeves at 42 which are jounalled in the bearings defined in the drum head 22 by the bearing surfaces 24 and the respective bearing caps 28.

Each picker bar 26 is hollow and encloses a spindle drive shaft 44 having driving pinions 46 in constant mesh with bevel pinions 48 on the inner ends of the spindles 38. The upper end of the shaft 44 is rotatably supported by a needle bearings 50 contained within the hollow portion of the bar 26, so that the maximum diameter of the bearing 50 is typically approximately equal to the inner diameter of the bar. A spacer 51 is located on the shaft 44 between the bearing 50 and the collar of the upper driving pinion 46 to provide added rigidity to the upper end of the shaft. The shaft 44 extends upwardly through the top of the bar 26. A pinion 52 keyed to the end of the shaft 44 is engaged by a drive gear 54 fixed to a sleeve 56 mounted for rotation about the drum shaft 18. The drum shaft 18 and drive gear 52 are driven in a conventional manner by the unit drive 16 to rotate the picker drum and spindles. Further details of the drive system may be had by reference to the aforementioned Hubbard patents.

Figure 2:
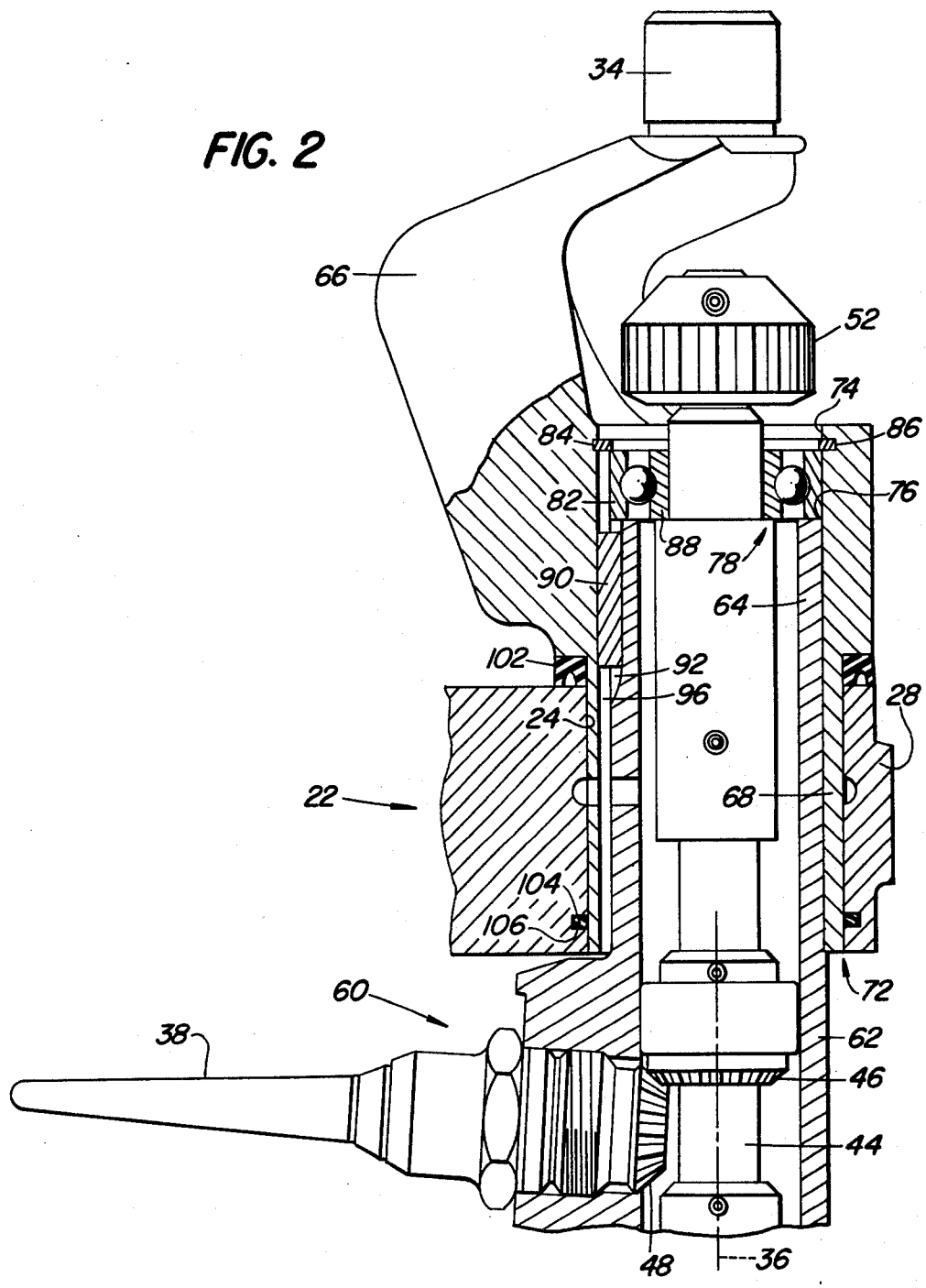
FIG. 2 is an elevational view, partially in section, of a portion of a row harvesting unit showing the upper portion of the picker bar assembly of the present invention.

Referring now to FIG. 2, therein is shown the upper portion of an improved picker bar assembly 60. Below the drum head 22 the assembly 60 is substantially the same as the conventional assembly 25 of FIG. 1. The assembly 60 includes a vertical picker bar 62 having an upper end 64 which projects above the drum head 22. Fixed to the upper end 64 is a cam arm or crank 66 having a downwardly directed extension 68 press fitted onto the bar 62 and extending into the drum head 22. The outer surface of the extension 68 is machined and forms the bearing area for the picker bar journal so that the picker bar 62, which in the preferred embodiment is fabricated from aluminum, does not require a wear sleeve and is not in direct frictional contact with drum head bearing 72 defined by the surface 24 and the cap 28. As seen in FIG. 2, the extension 68 substantially projects through the drum head 22.

The cam arm 66 includes a circular bore 74 which receives the upper end 64. However, rather than extending upwardly through substantially the entire length of the bore 74, the end 64 of the bar 62 terminates axially inwardly a substantial distance below the top of the bore and defines therewith a bearing-receiving seat 76. A high capacity roller bearing 78 includes an outer race 82 secured within the seat 76 of the bore 74 by a snap ring 84 inserted in an annular groove 86. An inner race 88 supports the spindle drive shaft 44 for rotation about the axis 36.

Key means including a key 90 inserted in keyways 92 and 96 in the bar 62 and arm 66, respectively, prevent relative rotation between the bar and arm. Preferably, the key 90 extends between the bottom of the bearing 78 and the top portion of the extension 68. The extension 68 provides a long length of press fit between the arm 66 and the bar 62 while permitting the high capacity roller bearing 78 to be utilized on the drive shaft 44.

A grease seal 102 is provided between the top of the drum head 22 and the bottom of the cam arm 66 adjacent the extension 68. A lower O-ring 104 is held within an annular groove 106 located in the lower portion of the drum head bearing 72. The seal 102 and O-ring 104 prevent dirt and other contaminants from entering the journal area and maintain lubricant between the outer wear surface of the extension 68 and the bearing 72.

Figure 3:
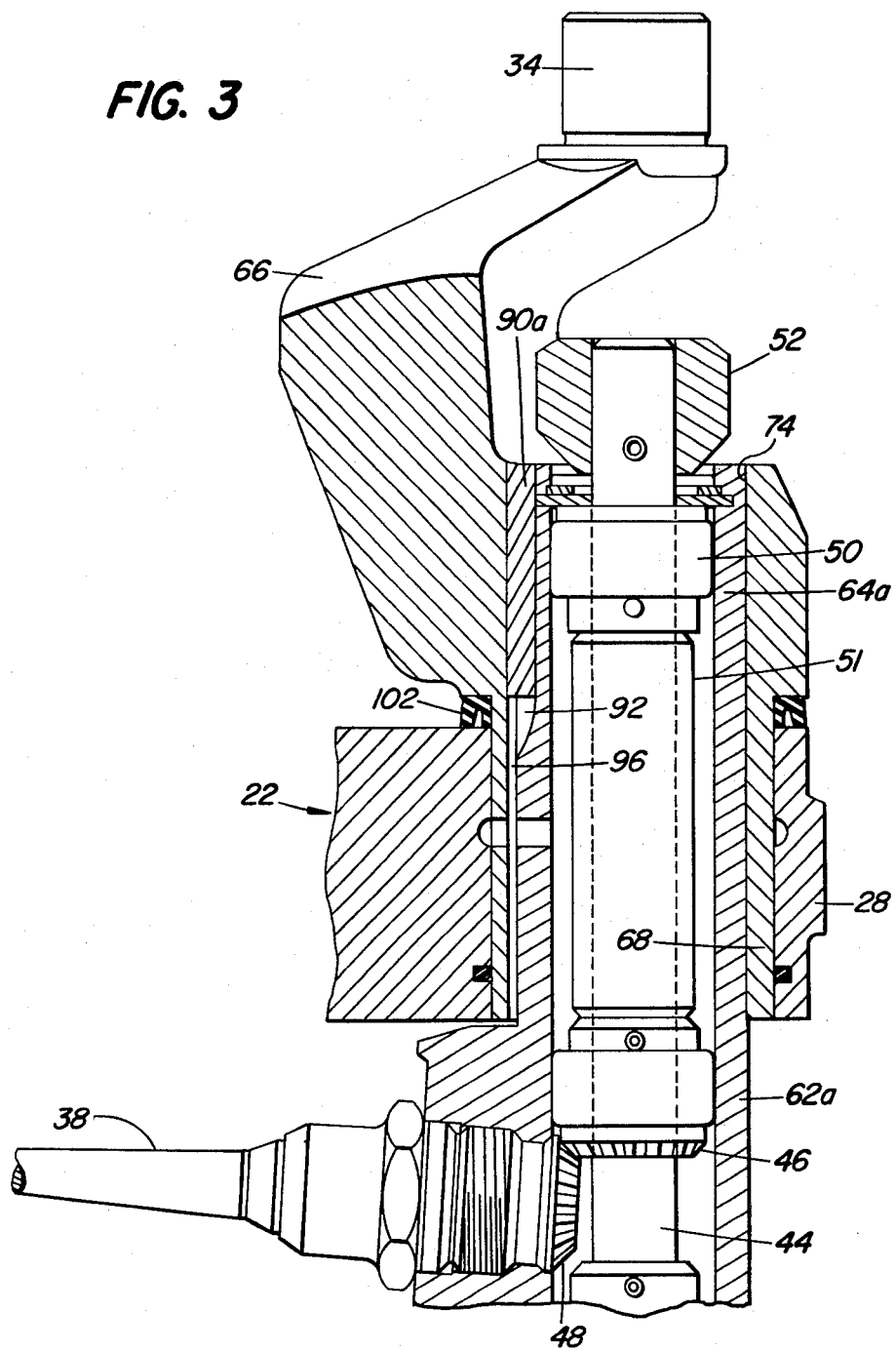
FIG. 3 is a view similar to FIG. 2 but showing an alternate embodiment of the invention.

The embodiment shown in FIG. 3 is similar to that of FIG. 2 except that the upper end 64a of the bar 62a extends through to the upper end of the cam arm bore 74, and the conventional bearing arrangement of FIG. 1 with a needle bearing 50 is provided within the hollow portion of the bar. The area of contact between the arm 66 and the bar 62a is thereby increased, and a longer key 90a is provided.

Figure 4:
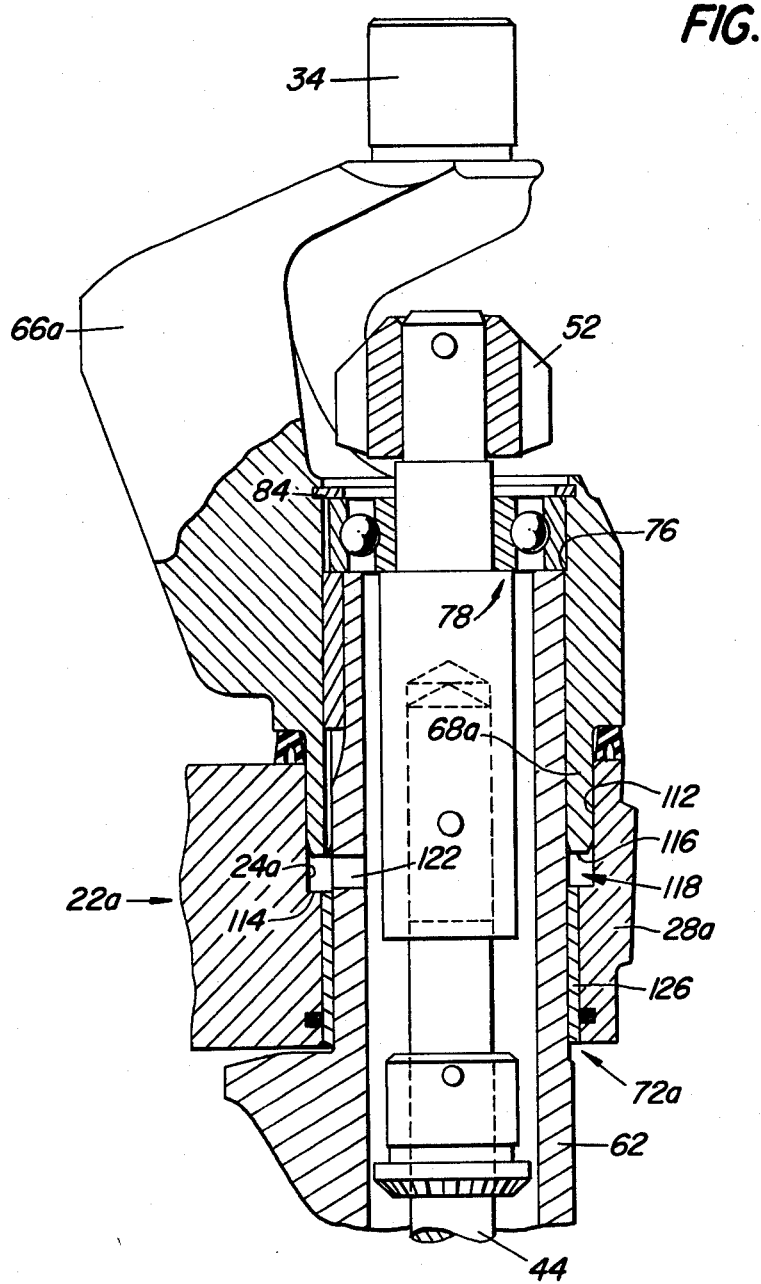
FIG. 4 is another view similar to FIG. 2 but showing an additional embodiment of the invention.

In yet another embodiment (FIG. 4), the cam arm 66a includes an extension 68a which terminates axially within the drum head bearing 72a between the top and the bottom of the drum head 22a. The bore 112 of the bearing 72a formed by surface 24a and bearing cap 28a is stepped at 114 below end 116 of the extension 68a to provide an annular grease reservoir 118. A aperture 122 in the bar 62 permits lubricant to flow from the hollow central portion of the bar to the reservoir 118. A picker bar bushing 126 extends axially downwardly from the stepped portion 114 to provide a wear surface between picker bar 62 and the lower portion of the bearing 72a.

Having described the preferred embodiment, it will be apparent that modifications can be made without departing from the scope of the invention as defined in the accompany claims.

I claim:

1. In a cotton harvesting unit having a rotatable drum head rotatably supporting an upright, spindle-carrying picker bar, said picker bar having a generally hollow, circular cross section; a cam arm connected to the upper end of the picker bar and a cam member engaging the cam arm to orient the picker bar about its axis as the drum head rotates, and a shaft extending through the bar for driving the spindles, the improvement comprising: said cam arm including a downward extension having a circular, constant-diameter bore extending vertically therethrough, wherein the upper end of the picker bar extends upwardly into the bore terminating therein at an upper end substantially above the drum head and below the top of the bore and defining therewith a bearing-receiving area; a bearing supported in the area, the diameter of said bearing being approximately equal to the bore diameter but greater than the inner diameter of the picker bar, said bearing journalling the spindle drive shaft for rotation with respect to the cam arm and picker bar; means for fixing the upper end of the picker bar against rotation in the bore; wherein the cam arm extension extends downwardly a substantial distance into the drum head and has a cylindrical outer surface of substantially constant diameter from a location adjacent the upper end of the bar to and including the lower end of the extension, and wherein the drum head includes a complementary cylindrical surface and the extension defines a picker bar journal rotatably supported in the complementary surface.

2. The improvement as set forth in claim 1 wherein the cam arm extension extends downwardly through the drum head and terminates at a lower end approximately level with the bottom of the drum head.

3. The improvement as set forth in claim 1 or 2 wherein the cam arm comprises an integral cast member, and the picker bar is fabricated from aluminum.

4. The improvement as set forth in claim 1 wherein the extension is press fitted over the picker bar and the portion of the cam arm above the extension is keyed to the picker bar.

5. In a cotton harvesting unit having a rotatable drum head with a bearing, an upright, spindle-carrying picker bar journalled in the drum head bearing, said drum terminating in a lower portion above the spindles, said picker bar having a generally hollow, circular cross section, a cam arm connected to the upper end of the picker bar and a cam member engaging the cam arm to orient the picker bar about its axis as the drum head rotates, and a shaft extending through the bar for driving the spindles, the improvement comprising: said cam arm including a cylindrical extension of constant diameter projecting through the arm downwardly into the drum head over the upper end of the picker bar and terminating substantially below the upper portion of the drum head, said extension of the cam arm including an outer portion rotatably supported in the drum head bearing and defining the picker bar journal, wherein the lower edge of the extension terminates as a position generally coinciding with or above the lower portion, and the upper end of the picker bar extends upwardly through the cam arm extension to a location above the drum head, and means located in the extension for fixing the bar against rotation with respect to the arm.

6. The improvement as set forth in claim 5 further including a drive shaft bearing supported within the cam arm above the extension and above the picker bar, said bearing rotatably supporting the upper end of the spindle drive shaft.

7. The improvement as set forth in claim 6 wherein the bearing comprises a roller bearing, and the outer diameter of the bearing is substantially greater than the inner diameter of the picker bar.

8. The improvement as set forth in claim 5 or 6 wherein the extension terminates in a lower edge axially above the bottom of the drum head, said improvement further including a generally annularly shaped grease reservoir defined by said lower edge and a portion of the drum head located below said lower edge.

9. The improvement as set forth in claim 6 further including key means located above the extension and below the drive shaft bearing for preventing relative rotation of the cam arm and picker bar.

10. The improvement as set forth in claim 5 further including a needle bearing supported within the upper end of the picker bar for rotatably supporting the upper end of the spindle drive shaft.

11. The improvement as set forth in claim 10 wherein the means for fixing the bar includes key means extending from said upper end to the drum head.

12. The improvement as set forth in claim 10 or 11 wherein the cam arm extension substantially terminates even with the lower portion.

* * * * *

UNITED STATES PATENT AND TRADEMARK OFFICE
CERTIFICATE OF CORRECTION

PATENT NO. : 4,463,543
DATED : 7 August 1984
INVENTOR(S) : Arthur Lowell Hubbard, Russell Dean Copley and Ronald Lee Reichen It is certified that error appears in the above-identified patent and that said Letters Patent is hereby corrected as shown below:

Column 4, line 56, delete "as" and insert -- at --.

Signed and Sealed this

Fifth Day of March 1985

[SEAL]

Attest:

DONALD J. QUIGG

Attesting Officer

Acting Commissioner of Patents and Trademarks